(12) United States Patent
Dell et al.

(10) Patent No.: US 8,021,253 B2
(45) Date of Patent: Sep. 20, 2011

(54) ONE-WAY ISOLATOR FOR HIGH TORQUE DEVICES

(75) Inventors: James W. Dell, Newmarket (CA); John R. Antchak, Aurora (CA); Trevor S. Smith, Toronto (CA)

(73) Assignee: Litens Automotive Inc., Woodbridge (CA)

( * ) Notice: Subject to any disclaimer, the term of this patent is extended or adjusted under 35 U.S.C. 154(b) by 326 days.

(21) Appl. No.: 12/298,036

(22) PCT Filed: Apr. 26, 2007

(86) PCT No.: PCT/CA2007/000695
§ 371 (c)(1),
(2), (4) Date: Oct. 22, 2008

(87) PCT Pub. No.: WO2007/121582
PCT Pub. Date: Nov. 1, 2007

(65) Prior Publication Data
US 2009/0176583 A1 Jul. 9, 2009

(51) Int. Cl.
*F16D 3/52* (2006.01)
*F16H 55/36* (2006.01)
(52) U.S. Cl. .................... 474/74; 474/94; 464/57
(58) Field of Classification Search ........... 474/74
See application file for complete search history.

(56) References Cited

U.S. PATENT DOCUMENTS

| | | |
|---|---|---|
| 3,019,871 A | 2/1962 | Sauzedde |
| 4,433,765 A | 2/1984 | Rude et al. |
| 5,139,463 A | 8/1992 | Bytzek et al. |
| 5,156,573 A | 10/1992 | Bytzek et al. |
| 5,638,931 A | 6/1997 | Kerr |
| 5,722,909 A | 3/1998 | Thomey |
| 5,893,355 A * | 4/1999 | Glover et al. ............ 123/559.1 |
| 6,044,943 A | 4/2000 | Bytzek et al. |
| 6,083,130 A | 7/2000 | Mevissen et al. |
| 6,394,248 B1 * | 5/2002 | Monahan et al. ............ 192/41 S |
| 6,637,571 B2 | 10/2003 | Arnold et al. |
| 6,691,846 B2 | 2/2004 | Titus et al. |
| 7,070,033 B2 | 7/2006 | Jansen et al. |
| 7,153,227 B2 | 12/2006 | Dell et al. |
| 7,207,910 B2 | 4/2007 | Dell et al. |
| 2003/0098214 A1 | 5/2003 | Titus et al. |
| 2004/0014540 A1 | 1/2004 | Dell et al. |
| 2005/0250607 A1 | 11/2005 | Jansen et al. |
| 2006/0144664 A1 | 7/2006 | Antchak et al. |

FOREIGN PATENT DOCUMENTS
WO WO03104673 A1 12/2003
(Continued)

*Primary Examiner* — David D Le
*Assistant Examiner* — Jacob S Scott
(74) *Attorney, Agent, or Firm* — Harness, Dickey & Pierce, PLC

(57) ABSTRACT

A one way isolator for high torque devices, such as alternator-starters, driven by a flexible drive means includes a hub and a sheave each of which includes at least one stop member. The hub and sheave are linked by a isolating spring and, via a bearing and/or bushing, can rotate with respect to each other to provide isolation, through the spring, from torque variations when torque is transferred from the flexible drive means to the device. When substantial amounts of torque are transferred from the device to the flexible drive means, the sheave rotates with respect to the hub to bring the stop members into contact such that the isolator then acts like a solid pulley to facilitate the transfer of the torque from the device.

21 Claims, 4 Drawing Sheets

FOREIGN PATENT DOCUMENTS

| WO | WO2004011818 A1 | 2/2004 |
| WO | WO2004/065811 | 8/2004 |
| WO | WO2004070225 A1 | 8/2004 |
| WO | WO2005028899 A1 | 3/2005 |
| WO | WO2005/057037 | 6/2005 |
| WO | WO2007003052 A1 | 1/2007 |

* cited by examiner

ONE-WAY ISOLATOR FOR HIGH TORQUE DEVICES

FIELD OF THE INVENTION

The present invention relates to an isolator pulley to connect devices to a flexible drive. More specifically, the present invention provides an isolator pulley providing device isolation when transferring torque between the flexible drive and the device in a first direction and solid pulley functionality when transferring torque between the flexible drive and the device in the opposite direction to permit the transfer of relatively high torque loads.

BACKGROUND OF THE INVENTION

Devices driven by flexible drive means, such as flexible belts or chains, are well known. In the automotive field, common examples of such devices include accessory devices, such as water pumps, alternators, power steering pumps, air conditioning compressors, etc. driven by a front engine accessory drive ("FEAD") or rear engine accessory drive ("READ"). Other examples can include belt-driven superchargers for internal combustion engines or a wide range of other devices driven from the internal combustion engine through a flexible drive.

The design and construction of FEAD and other flexible drive systems has been improved in the last several years by the provision of isolators and/or overrunning decouplers, instead of solid pulleys, on various high load/high inertia devices.

An isolator provides a resilient link, often a coil spring, between the flexible drive and the driven accessory device and the provided resiliency can reduce and/or dampen torsional vibration in the flexible drive which can otherwise adversely affect the expected operating lifetime of the flexible drive. In automotive applications, isolators have been employed as the crankshaft pulley and/or as the drive pulleys at various other accessory devices driven by the flexible drive means. Examples of prior art isolators are described in U.S. Pat. Nos. 5,139,463 and 7,153,227.

An overrunning decoupler provides a resilient link between the flexible drive means and the driven device in one direction, typically when the device is being driven by the flexible drive, and also prevents high inertia devices, such as alternators, from driving the flexible drive when the engine decelerates by allowing the device to overrun its drive pulley and the flexible drive. Examples of prior art decouplers are described in WO 2004/011818; WO 98/50709; U.S. Pat. Nos. 5,156,573 and 6,044,943.

While isolators and/or overrunning decouplers improve the operation and longevity of flexible drive systems, more recently automobiles, trucks and other vehicles have begun to employ various hybrid strategies for their drive systems. Such hybrid strategies include combined internal combustion engine/electric drive strategies and/or start/stop strategies.

With vehicles employing start/stop hybrid strategies, once the internal combustion engine has achieved a preselected set of conditions/parameters, such as reaching a selected operating temperature, the internal combustion engine is shut down whenever the vehicle is stopped in traffic or at traffic lights, etc. and is restarted when the vehicle is to be moved again. One common method of restarting the internal combustion engine in a start/stop hybrid is with an alternator-starter device on a flexible drive, such as a FEAD, and this system is typically referred to as a Belt Alternator Starter ("BAS") system.

When the internal combustion engine is running in a BAS system, the alternator-starter is functioning as an alternator, producing electrical current for the vehicle and/or charging the storage battery of the vehicle. When the internal combustion engine is stopped, the alternator-starter can draw current from the storage battery and can operate as a starter motor, rotating the crankshaft of the engine via the flexible drive, to restart the engine. Further, in some cases BAS systems can provide a boost mode wherein the alternator-starter can draw current from the storage battery of the vehicle when the engine is running to provide additional power to the engine via the torque supplied to the engine from the alternator-starter via the flexible drive. Such a boost mode can be useful in situations such as passing another vehicle or wherever additional power is required for limited periods of time.

While BAS systems can provide many advantages, the very high inertia of the alternator-starter device can affect the operation and longevity of the flexible drive system, yet the necessity for the alternator-starter, when operating as a starter, to transfer high amounts of torque to the engine through the flexible drive means prevents the use of conventional isolators or overrunning decouplers.

It has been proposed to provide a decoupler with an inertia activated locking mechanism as shown in WO 2007/1003052.

It is desired to have an isolator which can be used with BAS systems and other flexible drive devices which require transfer of relatively high levels of torque in one direction between the device and the flexible drive and at least some degree of isolation when transferring torque in the opposite direction.

SUMMARY OF THE INVENTION

It is an object of the present invention to provide a novel one way isolator which obviates or mitigates at least one disadvantage of the prior art.

According to a first aspect of the present invention, there is provided a one way isolator to transfer torque between a flexible drive and a device, comprising: a hub for mounting to the input shaft of the device, the hub including at least one stop member; a sheave rotatably mounted to the hub and including at least one stop member; a spring having a first end engaging the hub and a second end engaging the sheave to elastically couple the hub and sheave; wherein the at least one stop member of the hub abuts the at least one stop member of the sheave when torque is transferred in a first direction between the device and the flexible drive means such that the torque is substantially transferred through the respective stop members and, when torque is transferred between the flexible drive and the device in the opposite direction, the sheave rotates with respect to the hub such that the at least one stop member of the hub disengages the at least one stop member of the sheave and the torque is transferred through the spring.

Preferably, the hub includes at least two stop members and the sheave includes a respective number of stop members, each stop member of the hub engaging a respective stop member of the sheave when torque is transferred from the device to the flexible drive means The present invention provides a one way isolator for high torque devices, such as alternator-starters, driven by a flexible drive means. The isolator includes a hub and a sheave each of which includes at least one stop member. The hub and sheave are linked by a isolating spring and, via a bearing and bushing, can rotate with respect to each other to provide isolation through the spring from torque variations when torque is transferred from the flexible drive means to the device. When substantial amounts of torque are transferred from the device to the flexible drive means, the sheave rotates with respect to the hub to bring the stop members into contact such that the isolator then acts like a solid pulley to facilitate the transfer of the torque from the device.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
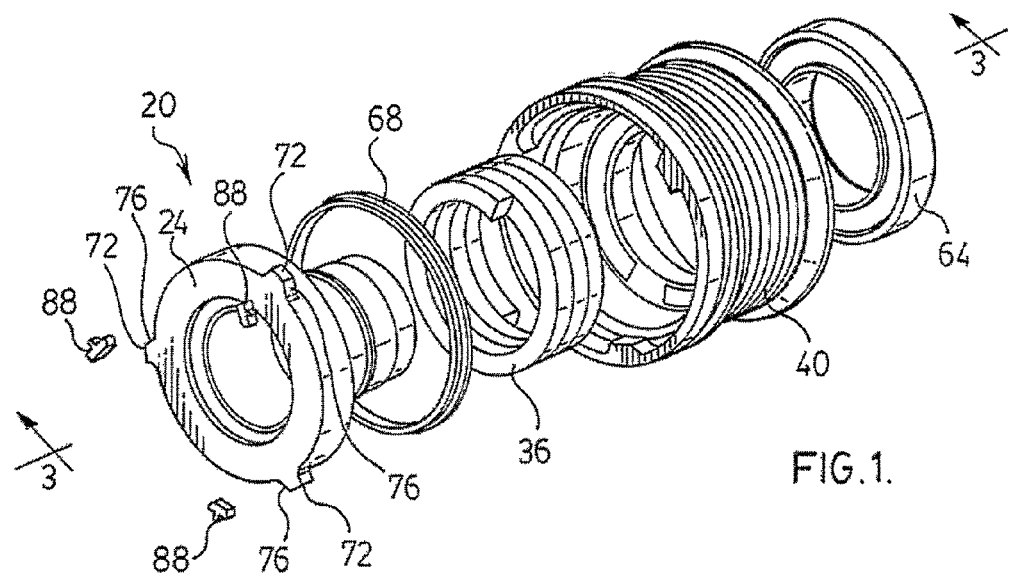
FIG. 1 shows an exploded perspective view of the front and side of a one way isolator in accordance with the present invention.
Figure 2:
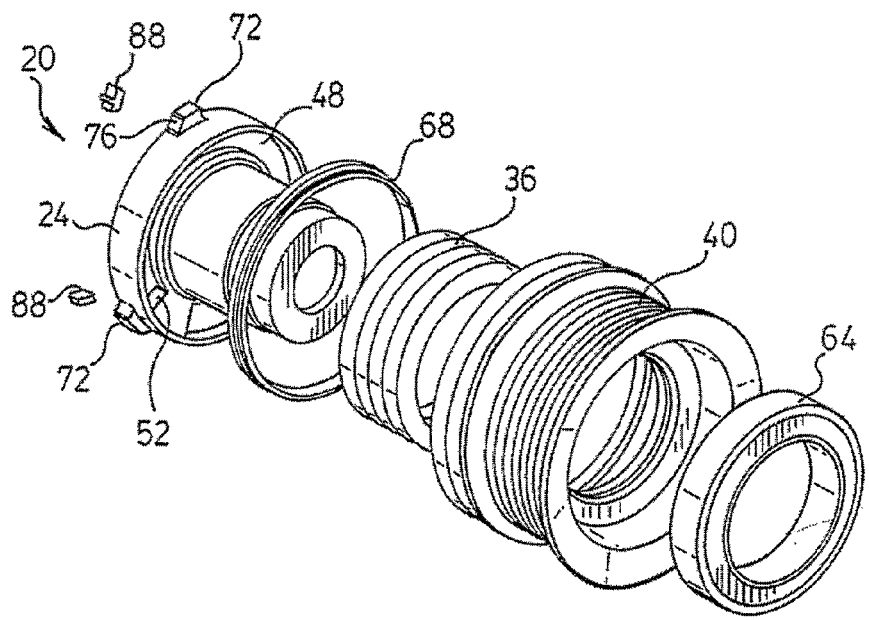
FIG. 2 shows an exploded perspective view of the rear and side of the one way isolator of FIG. 1.
Figure 3:
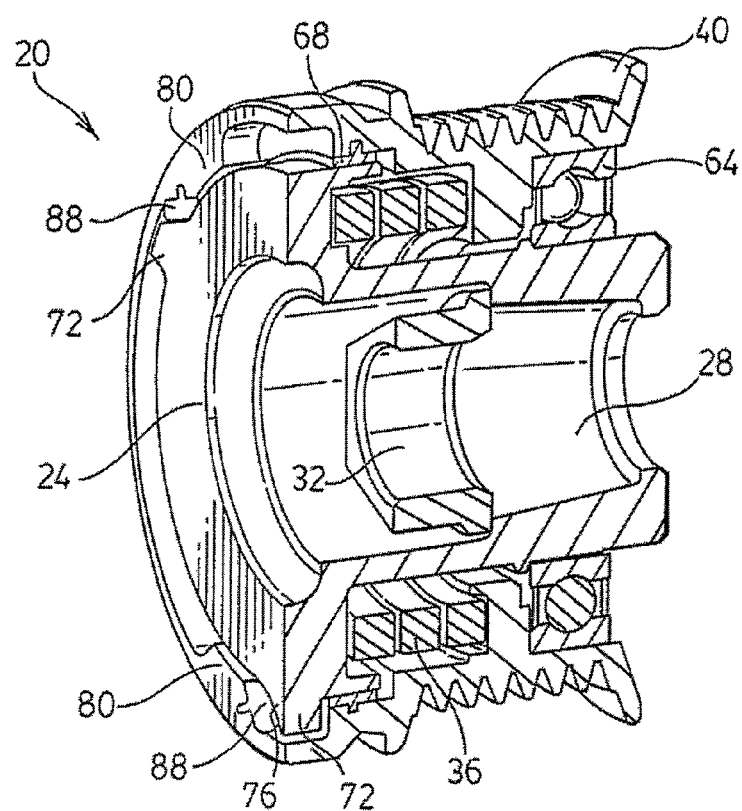
FIG. 3 shows a cross section taken along line 3-3 of FIG. 1.

A one way isolator, in accordance with an embodiment of the present invention, is indicated generally at 20 in FIGS. 1, 2 3, and 5. Isolator 20 comprises a hub 24 which can be mounted on the drive shaft of a device (not shown) such as an alternator-starter, supercharger, air conditioning compressor (typically via an electric clutch mechanism), etc., which is to be rotatably driven about an axis by a flexible drive means such as a belt or chain. As best seen in FIG. 3, in the illustrated embodiment, hub 24 is intended to be mounted on an input shaft with a constant cross section, and hub 24 includes a conical portion 28 which can receive a mounting bushing (not shown) with a complementary outer conical surface and an inner surface complementary to the outer surface of the input shaft. As a mounting nut 32 is tightened on the end of the input shaft, the mounting bushing is driven into conical portion 28 to provide an interference fit-based lock between hub 24 and the input drive shaft.

As will be apparent to those of skill in the art, while the interference fit-based locking of hub 24 to the input shaft is presently preferred, as it can avoid the need for expensive machining operations during manufacturing of isolator 20 and/or the input shaft, the present invention is not limited to the use of such an interference fit-based locking of hub 24 to the input drive shaft and any suitable method of mounting hub 24 to the input shaft, such as by keyed or splined embodiments amongst others, are also contemplated by the present inventors.

Figure 4:
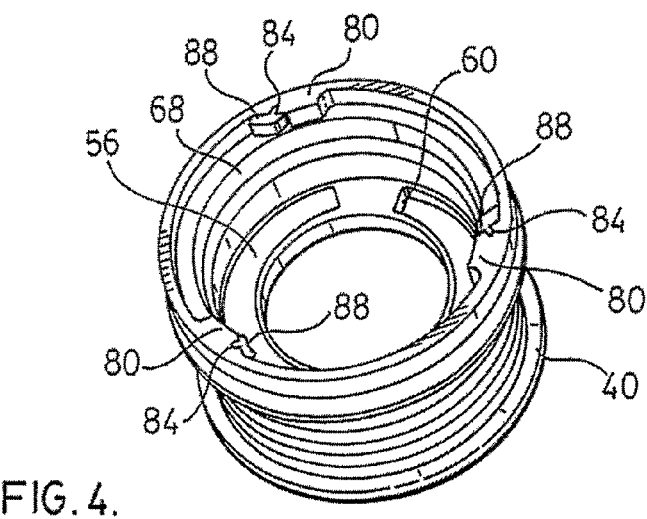
FIG. 4 shows a perspective view of the front and side of a sheave of the one way isolator of FIG. 1.

An isolator spring 36, preferably in the form of a coil spring with coils having a square or rectangular cross section, operatively connects or links hub 24 and a pulley sheave 40. Hub 24 includes a helical raceway 48 to receive one end face of spring 36. Raceway 48 includes an end stop 52 against which one end of spring 36 abuts. As best seen in FIG. 4, sheave 40 also includes a helical raceway 56 to receive the opposite end face of spring 36 and raceway 56 includes an end stop 60 against which the second end of spring 36 abuts.

When spring 36 is a coil spring, or the like, it is preferably formed with a locking feature at each end to prevent each end of the spring 36 from separating from end stop 52 and/or end stop 60 when sheave 40 is rotated away from the ends of spring 36. In a present embodiment, this locking feature is achieved by forming a small bend, radially inward, at each end of spring 36 and providing a corresponding curve in helical raceway 48 and helical raceway 56 into which the small bend is received via a press fit. In this manner, undesired wear and/or mechanical noise which would otherwise result from movement of spring 36 with respect to helical raceways 48 and 56 and stops 52 and 60 is avoided.

While it is presently preferred that isolator spring 36 be in the form of a coil spring, the present invention is not so limited and any appropriate spring mechanism, as will occur to those of skill in the art, can be employed including springs made from rubber or other elastomeric materials and/or coil springs with windings having non-square cross sections.

A bearing 64 and a bushing 68 act between hub 24 and sheave 40 to allow sheave 40 to rotate, as spring 36 is torqued and released, with respect to hub 24 and the device input shaft to which hub 24 is mounted. In a presently preferred embodiment, bearing 64 is a sealed roller bearing and bushing 68 is fabricated from a suitable low friction and high wear material such as NYLON™. Bearing 64 is preferably located at a point as close as possible to the point directly under the surface of sheave 40 on which the flexible drive will run to reduce/avoid off-axis loads. However, it is typically required, due to packaging issues, to locate bearing 64 somewhat offset from the preferred position, as illustrated in the Figures, and thus bushing 68 is used to assist carrying the resulting off axis loads.

Figure 5:
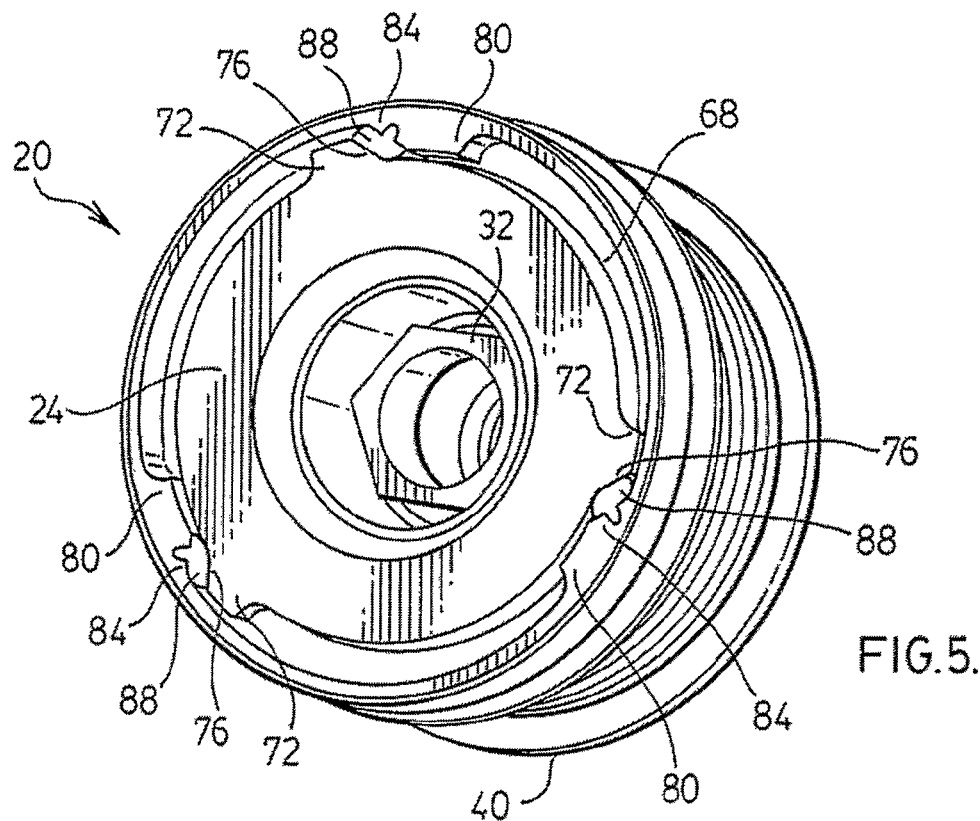
FIG. 5 shows a perspective view of the front and side of the one way isolator of FIG. 1.

As best seen in FIGS. 1, 2 and 5, hub 24 includes at least one, and preferably three or more, radially extending stops 72 on its front face. Each stop 72 includes a stop surface 76 which is preferably inclined relative to the circumferential or radial directions. As is best seen in FIG. 4, sheave 40 includes a matching number of stops 80 to stops 72 and each stop 80 includes a stop surface 84 with a substantially complementary incline to the incline of stop surfaces 76.

When assembled, as shown in FIGS. 3 and 5, the position of end stop 52 and end stop 60 and the length of spring 36 can be selected such that stop surfaces 76 are spaced by several degrees from stop surfaces 84 when no load is on isolator 20. Stop surfaces 76 are spaced from the stop surfaces 84 such that during normal operation, the stop surfaces 76 do not contact or engage stop surfaces 84.

To prevent noise and vibration, a resilient member 88 is positioned between stop surfaces 76 and stop surfaces 84, mounted to one of stop surfaces 76 or stop surfaces 84 (as illustrated), and resilient members 88 can be fabricated from any suitable material, such as a high density NYLON™ or urethane, and can be attached to the appropriate stop by any suitable method.

In operation, once isolator 20 is installed on the input shaft of a device, torque transferred in one direction from the flexible drive to the device causes sheave 40 to rotate from the no load position with respect to hub 24 to move stop surfaces 76 and 84 away from one another and spring 36 thus acts as a resilient link between the flexible drive means and the driven device and isolator 20 operates much as a conventional isolator, isolating the flexible drive means and the device from minor variations in the transferred torque.

However, if the direction of the transfer of torque changes such that substantial torque is transferred in the other direction from the device to the flexible drive means, such as if the device on which isolator 20 is installed is an alternator-starter which is operating in starter mode or in boost mode, the torque rotates sheave 40 with respect to hub 24 to bring stop surfaces 76 and 84 into contact, with resilient member 88 therebetween, such that isolator 20 operates as a solid pulley to facilitate the transfer of torque from the device to the flexible drive means through the contact between the stop surfaces, rather than through spring 36.

Isolator 20 is not limited to use with alternator-starter devices or BAS systems and can be advantageously installed on many other high load/high inertia devices such as superchargers. Superchargers are typically driven by flexible drive means and exert high loads on the flexible drive means and have high levels of inertia. As the supercharger is activated and deactivated, the load it places on the flexible drive means will vary significantly. Further, as the engine is accelerated or decelerated, the high inertia of the supercharger will apply large transfers of torque between the flexible drive and the supercharger in both directions.

Accordingly, isolator 20 can be installed on the input drive shaft to a supercharger to provide isolation when the flexible drive means is driving the supercharger. In this operating condition, spring 36 will be torqued to provide at least some isolation of the supercharger from the flexible drive means. When the inertia of the supercharger results in a transfer of torque in the opposite direction, such as when the engine is quickly decelerated, sheave 40 will be rotated back, relative to hub 24, to bring stop surfaces 76 and 84 into contact, with resilient members 88 therebetween, to absorb any impact which occurs between stop surfaces 76 and 84 and to limit further rotation of sheave 40.

Accordingly, isolator 20 operates as a substantially conventional isolator when transferring torque in one direction between a flexible drive and a device, such as an alternator-starter or supercharger, on which isolator 20 is installed and isolator 20 operates as a solid pulley when transferring significant amounts of torque between the device and the flexible drive in the opposite direction.

Figure 6:
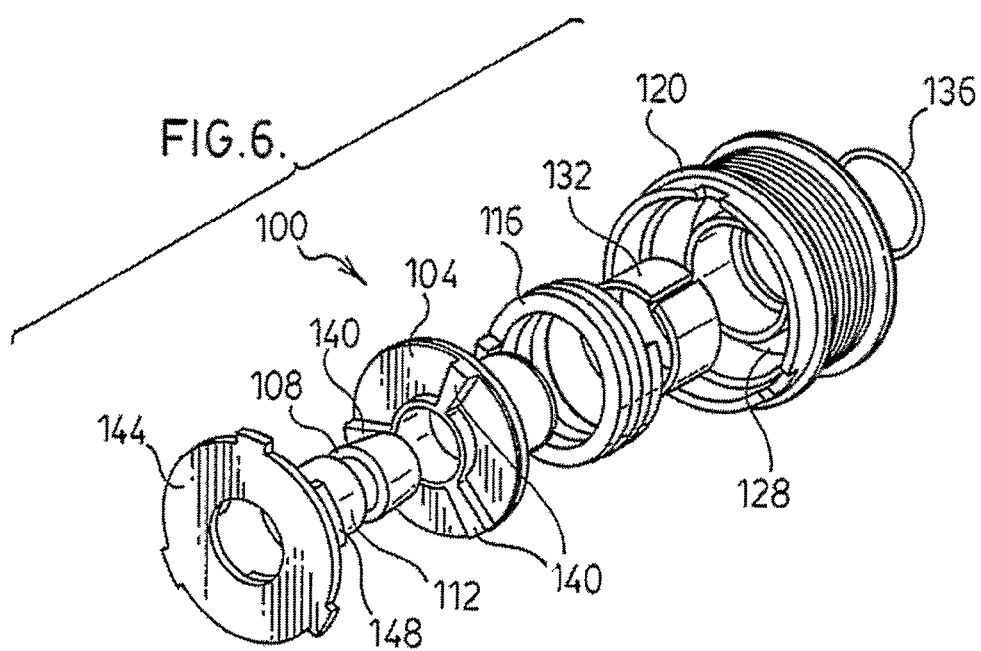
FIG. 6 shows an exploded perspective view of the front and side of another one way isolator in accordance with the present invention.

FIG. 6 shows another embodiment of a one way isolator 100 in accordance with the present invention. Isolator 100 comprises a hub 104 which can be mounted on the drive shaft of a device (not shown) such as an alternator-starter, supercharger or air conditioning compressor, etc.

In the illustrated embodiment, hub 104 includes a conical portion (similar to conical portion 28 of isolator 20) which can receive a conical tapered sleeve 108 which is driven into the conical portion by a nut 112 which engages a threaded portion on the end of the input shaft of the device to which isolator 100 is mounted. Tapered sleeve 108 thus forms an interference fit to the input shaft, locking isolator 100 to the shaft. As will be apparent to those of skill in the art, the present invention is not limited to the use of such conical interference connections and any other suitable manner for connecting isolator 100 to the input shaft of a device can be employed.

An isolator spring 116, preferably in the form of a coil spring with coils of a square or rectangular cross section, operatively connects hub 104 and a pulley sheave 120. In the illustrated embodiment, hub 104 includes a helical raceway 124 to receive one end of spring 116 and sheave 120 includes a similar helical raceway 128 to receive the opposite end of spring 116. Each of raceway 124 and raceway 128 provides a stop surface against which the respective end of spring 116 abuts to elastically transfer torque to or from hub 104 and sheave 120, during normal operation.

When spring 116 is a coil spring, or the like, it is preferably formed with a locking feature at each end to prevent each end of the spring 116 from separating from the respective stop surface when sheave 120 is rotated away from the ends of spring 116. In a present embodiment, this locking feature is achieved by forming a small bend, radially inward, at each end of spring 116 and providing a corresponding curve in helical raceway 124 and helical raceway 128 into which the small bend is received via a press fit. In this manner, undesired wear and/or mechanical noise which would otherwise result due to movement of spring 116 with respect to helical raceways 124 and 128 is avoided.

While it is presently preferred that isolator spring 116 be in the form of a coil spring, the present invention is not so limited and any appropriate spring mechanism, as will occur to those of skill in the art, can be employed including springs made from rubber or other elastomeric materials and/or coil springs with windings having non-square cross sections.

As will be apparent to those of skill in the art, by providing raceways 124 and 128, spring 116 is received in hub 104 and sheave 120 without the need for either end of spring 116 to be ground and/or flattened, thus avoiding the expense of a further manufacturing step. However, if it is desired to reduce the overall height of isolator 100, or if spring 116 is not a coil spring, raceways 124 and 128 can be omitted. In such a case, if spring 116 is a coil spring, the ends of spring 116 can be ground to flatten them axially and reduce stack height of the coil spring.

A bushing 132 is provided between hub 104 and sheave 120 to allow sheave 120 to rotate on hub 104. Bushing 132 can be any suitable bushing and, in the illustrated embodiment, is a split cylindrical steel bushing with an appropriate anti-friction surface applied to it.

The rear end of isolator 100 can also include a seal, such as O ring 136, to inhibit the ingress of water, dirt or other foreign materials into isolator 100 and or the surfaces of bushing 132.

As best seen in FIG. 6, at least one stop 140 is provided at the front of hub 104 and, in the illustrated embodiment, three equi-spaced axially extending stops 140 are provided. A front plate 144 is mounted to sheave 120 by any appropriate manner, such as staking, and rotates with sheave 120. Front plate 144 acts as a thrust surface for the axial spring load from spring 116 and provides at least one axially extending stop 148.

Figure 7:
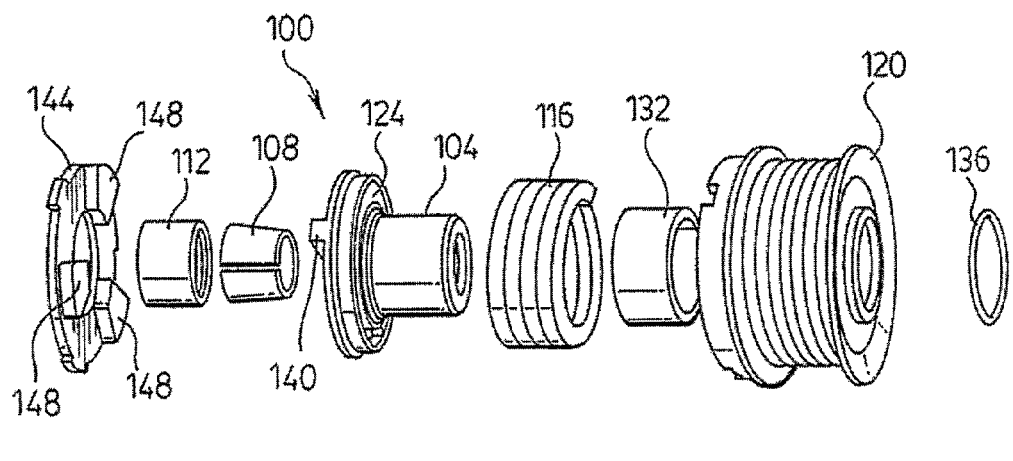
FIG. 7 shows an exploded perspective view of the side and back of the one way isolator of FIG. 6.

Specifically, as best seen in FIG. 7, front plate 144 includes, on its inner surface, at least one stop 148 and, in the illustrated embodiment, three stops 148 are provided. Preferably, at least one of the set of stops 140 or the set of stops 148 are provided with a coating of resilient material, such as Arnitel™ (as sold by DSM Engineered Plastics of Evansville, Ind., USA).

In operation, once isolator 100 is installed on the input shaft of a device, torque is elastically transferred from the flexible drive to the device by spring 116. When torque is transferred in the opposite direction from the device to the flexible drive, stops 140 and 148 will rotate relative to each other until abutment and isolator 100 will act as a solid pulley for the direct transfer of torque in this direction.

In a present embodiment of isolator 100, helical raceways 124 and 128 and the length of spring 116 are selected such that, under no load conditions, stops 140 are located about sixty degrees of rotation from stops 148 in the direction of rotation for which one way isolator 100 is to act as an isolator, to provide sufficient travel to prevent contact between the stops under expected operating conditions, when acting as an isolator, and about ten degrees of rotation from stops 148 in the direction of rotation for which one way isolator 100 is to act as a solid pulley. The spacing of about ten degrees is intended to prevent undesired contact between the stops when isolator 100 is acting as an isolator under light load conditions, when sheave 120 may rotate, to a small extent, in this direction.

As will be apparent to those of skill in the art, the number of stops 140 and 148 are selected to be appropriate to transfer the expected torque loads, when isolator 100 is acting as a solid pulley. However, as will also be apparent, higher numbers of stops reduce the range through which hub 104 can rotate with respect to sheave 120 to provide isolation via spring 116. Thus, it is expected that the minimum number of stops required to safely transfer the expected maximum torque will be provided.

The above-described embodiments of the invention are intended to be examples of the present invention and alterations and modifications may be effected thereto, by those of skill in the art, without departing from the scope of the invention which is defined solely by the claims appended hereto.

What is claimed is:

1. A one way isolator to transfer torque between a flexible drive means and a device, comprising:
    a hub configured for mounting to an input shaft of the device, the hub including at least one stop member;
    a sheave rotatably mounted to the hub and including at least one stop member;
    a torsion spring extending longitudinally along a rotational axis of the hub between the hub and the sheave, the torsion spring having a first end engaging the hub and a second end engaging the sheave to elastically couple the hub and sheave;
    wherein rotary power is transmitted between the at least one stop member of the hub and the at least one stop member of the sheave when torque is transferred in a first rotational direction from the hub to the sheave to drive the flexible drive means and, when torque is transferred from the sheave to the hub in the first rotational direction, the sheave is rotatable with respect to the hub such that the torque is not transmitted between the at least one stop member of the hub and the at least one stop member of the sheave and the torque is transferred from the sheave, through the torsion spring and into the hub.

2. The one way isolator of claim 1 wherein the isolator further comprises a resilient member located between the at least one stop member of the hub and the at least one stop member of the sheave.

3. The one way isolator of claim 2 wherein the sheave is rotatably mounted to the hub by at least one bearing.

4. The one way isolator of claim 3 wherein the at least one bearing is a bushing.

5. The one way isolator of claim 4 further comprising a roller bearing rotatable mounting the sheave on the hub.

6. The one way isolator of claim 1, wherein said hub has a helical raceway receiving the first end of the torsion spring.

7. The one way isolator of claim 6, wherein said sheave has a helical raceway receiving the second end of the torsion spring.

8. The one way isolator of claim 7, wherein said at least one stops are radially extending.

9. The one way isolator of claim 8 wherein the isolator further comprises a resilient member located between the at least one stop member of the hub and the at least one stop member of the sheave.

10. The one way isolator of claim 7, wherein at least one of the stop members is axially extending.

11. The one way isolator of claim 10, wherein at least one of the stop members is coated with a resilient material.

12. The one way isolator of claim 11 wherein the sheave includes a face plate joined thereto and the at least one stop member is on the face plate.

13. The one way isolator of claim 1 wherein the hub includes at least two stop members and the sheave includes a corresponding number of stop members, each stop member of the hub engaging a respective stop member of the sheave when torque is transferred from the hub to the sheave.

14. The one way isolator of claim 13 wherein each stop member of the hub rotates relative to the respective stop member of the sheave when torque is transferred from the sheave to the hub.

15. The one way isolator of claim 14 wherein the isolator further comprises resilient members located between the at least two stop members of the hub and the at least two stop members of the sheave.

16. The one way isolator of claim 15, wherein said hub has a helical raceway receiving the first end of the torsion spring and said sheave has a helical raceway receiving the second end of the torsion spring.

17. The one way isolator of claim 14, wherein the at least two stop members are coated with a resilient material.

18. The one way isolator of claim 17, wherein said hub has a helical raceway receiving the first end of the torsion spring and said sheave has a helical raceway receiving the second end of the torsion spring.

19. The one way isolator of claim 18 wherein the sheave includes a face plate joined thereto and the at least two stop members are radially extending on the face plate.

20. The one way isolator of claim 19 wherein said hub has a conical portion configured to receive an input shaft of the device in an interference fit.

21. The one way isolator of claim 20 wherein the sheave is rotatably mounted to the hub by a bushing.

\* \* \* \* \*